(12) United States Patent
Wang et al.

(10) Patent No.: US 12,445,724 B2
(45) Date of Patent: Oct. 14, 2025

(54) METHOD AND APPARATUS FOR DETECTING JITTER IN VIDEO, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Xiangyang Wang, Beijing (CN); Huaifei Xing, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 455 days.

(21) Appl. No.: 17/932,831

(22) Filed: Sep. 16, 2022

(65) Prior Publication Data

US 2023/0013170 A1    Jan. 19, 2023

(30) Foreign Application Priority Data

Sep. 18, 2021   (CN) .......................... 202111112132.X

(51) Int. Cl.
H04N 23/68   (2023.01)
(52) U.S. Cl.
CPC ................ H04N 23/6811 (2023.01)
(58) Field of Classification Search
CPC ............. H04N 23/6811; H04N 23/681; H04N 23/6815; H04N 23/68; H04N 5/144
See application file for complete search history.

(56) References Cited

U.S. PATENT DOCUMENTS

2005/0195295 A1*  9/2005  Kawai .................. H04N 23/698
                                                      348/239
2010/0134639 A1*  6/2010  Takeuchi ............... H04N 23/68
                                                      348/208.4

FOREIGN PATENT DOCUMENTS

| CN | 103763461   | 4/2014  |
| CN | 104135597   | 11/2014 |
| CN | 107958462   | 4/2018  |
| JP | 2005102082 A | 4/2005  |
| JP | 2007096481 A | 4/2007  |
| JP | 2007267115 A | 10/2007 |
| JP | 2008118638 A | 5/2008  |
| JP | 2011082901 A | 4/2011  |

(Continued)

OTHER PUBLICATIONS

JPO, Office Action for JP Application No. 2022-127538, Aug. 29, 2023.

(Continued)

*Primary Examiner* — Nicholas G Giles
(74) *Attorney, Agent, or Firm* — Hodgson Russ LLP

(57) ABSTRACT

A method for detecting a jitter in a video includes obtaining video frames of a video, in which the video frames include a target video frame and a plurality of historical video frames before the target video frame, determining moving distances in a preset distance of the video frames relative to corresponding previous video frames, determining a target amplitude and a target period in the preset direction for the target video frame; and determining that there is a jitter in a video in response to the target amplitude in the preset direction determined for the target video frame being greater than a preset amplitude and the target period being less than a preset period.

17 Claims, 4 Drawing Sheets

(56) References Cited

FOREIGN PATENT DOCUMENTS

JP 2011097512 A 5/2011
WO 2010025963 A1 3/2010

OTHER PUBLICATIONS

EPO, Extended European Search Report for EP Application No. 22196149.3, Feb. 2, 2023.
Khare et al., "Fast and robust video stabilisation with preserved intentional camera motion and smear removal for infrared video," IET Image Processing, 2020, vol. 14, No. 2.
CNIPA, Office Action for CN Application No. 202111112132.X, May 7, 2022.

\* cited by examiner

METHOD AND APPARATUS FOR DETECTING JITTER IN VIDEO, ELECTRONIC DEVICE, AND STORAGE MEDIUM

CROSS REFERENCE TO RELATED APPLICATIONS

This application claims priority and benefits to Chinese Application No. 202111112132.X, filed on Sep. 18, 2021, the entire content of which is incorporated herein by reference.

TECHNICAL FIELD

The present disclosure relates to a field of image processing technologies, in particular to fields of intelligent recommendation and media cloud technologies, and in particular to a method and an apparatus for detecting a jitter in a video, an electronic equipment, and a storage medium.

BACKGROUND

In the process of video shooting, recording, and monitoring, there may be situations where the image capturing device shakes and the quality of the recorded video is poor. Therefore, an objective, fast, and effective method is needed to detect whether there is a jitter in the video, so as to facilitate subsequent device stabilization or image stabilization processing.

SUMMARY

According to a first aspect, there is provided a method for detecting a jitter in a video. The method includes:
  acquiring video frames of a video, the video frames include a target video frame and a plurality of historical video frames before the target video frame;
  determining a first moving distance of each of the video frames relative to a previous video frame in a preset direction;
  determining an amplitude and a period of the target video frame in the preset direction based on the first moving distances of the video frames;
  in response to the amplitude of the target video frame in the preset direction being greater than an amplitude threshold and the period of the target video frame in the preset direction being less than a period threshold, determining that the target video frame has a jitter; and
  determining that there is a jitter in the video in response to determining that the target video frame has a jitter.

According to a second aspect, there is provided an electronic device. The electronic device includes:
  at least one processor; and a memory communicatively connected with the at least one processor; in which the memory stores instructions executable by the at least one processor, and when the instructions are executed by the at least one processor, the at least one processor is caused to perform the method described in the foregoing aspect.

According to a third aspect, there is provided a non-transitory computer-readable storage medium, having computer instructions stored thereon. The computer instructions are configured to cause a computer to perform the method described in the foregoing aspect.

It understandable that the content of this section is not intended to identify key or critical features of embodiments of the disclosure, nor is it intended to limit the scope of the disclosure. Other features of the disclosure will become readily understood from the following description.

BRIEF DESCRIPTION OF THE DRAWINGS

The accompanying drawings are used for better understanding of the technical solution of the disclosure, and do not constitute a limitation to the disclosure.

DETAILED DESCRIPTION

The following describes embodiments of the disclosure with reference to the accompanying drawings, which include various details of embodiments of the disclosure to facilitate understanding, and should be regarded as merely exemplary. Therefore, those of ordinary skill in the art should recognize that various changes and modifications can be made to the embodiments described herein without departing from the scope of the disclosure. Likewise, for clarity and conciseness, descriptions of well-known functions and structures are omitted in the following description.

A method and apparatus for detecting a jitter in a video, an electronic device, and a storage medium according to embodiments of the disclosure will be described with reference to the accompanying drawings.

In related arts, it is determined whether there is a jitter in the video based on the jitter amplitude. When the camera device moves back and forth slowly, the calculated jitter amplitude may be large. Therefore, it may be considered that there is a jitter in a target video frame. However, the calculated jitter amplitude is actually normal movement of the image capturing device, which resulting in misjudgment. To this end, the disclosure provides a method for detecting a jitter in a video, which acquires a target video frame and a plurality of historical video frames before the target video frame, determines a first moving distance of each of video frames relative to a previous video frame in the preset direction; determines an amplitude and a period of the target video frame in the preset direction based on the first moving distances of the video frames; and determines that there is a jitter in a video in response to the amplitude of the target video frame in the preset direction being greater than an amplitude threshold and the period of the target video frame in the preset direction being less than a period threshold. In the disclosure, jitter conditions of the video frames are considered based on the jitter amplitudes and the periods of the video frames, which avoids misjudgment of the jitter and improves the accuracy of video jitter detection.

Figure 1:
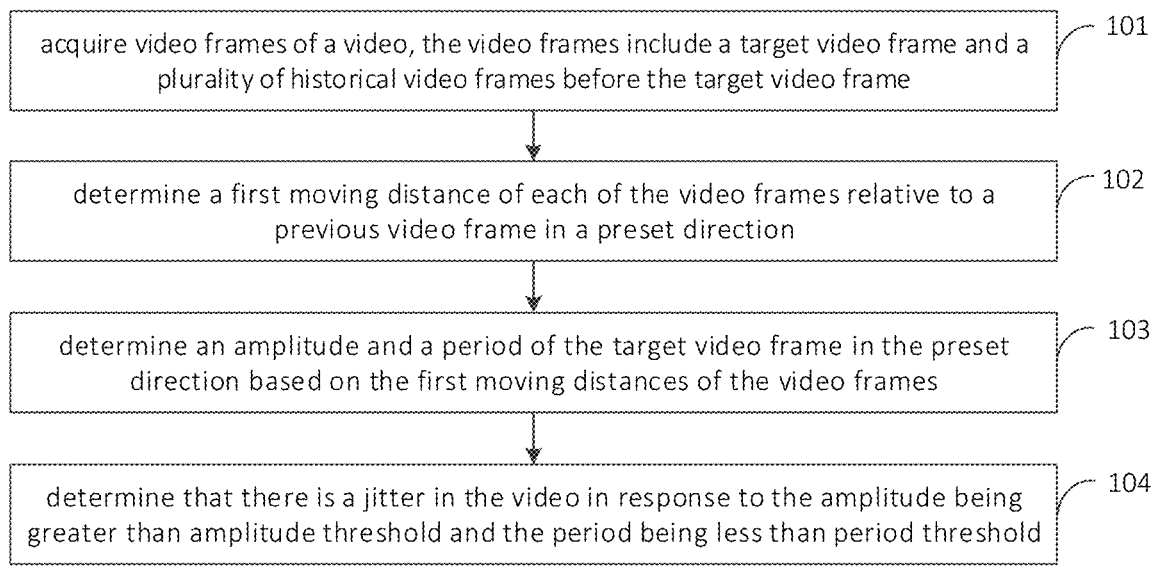
FIG. 1 is a flowchart illustrating a method for detecting a jitter in a video according to examples of the disclosure.

FIG. 1 is a flowchart illustrating a method for detecting a jitter in a video according to examples of the disclosure.

As illustrated in FIG. 1, the method includes the following steps.

In step 101, video frames of a video are acquired. The video frames includes a target video frame and a plurality of historical video frames before the target video frame.

It is understandable that a video is composed of video frames. The "video frame" is also called an image frame or an image. The target video frame may be any one of the video frames in a video playback process, or a current video frame in the video playback process. The target video frame may also be any one of video frames in a video segment of the video or a specific video frame.

A video segment "A" contains for example 30 video frames. In order to distinguish these video frames, the video frames are numbered 1, 2, 3 . . . , 30. If the target video frame is the $30^{th}$ video frame, i.e. the video frame numbered 30, the video frames numbered 1 to 29 are the historical video frames before the target video frame (i.e. the video frame numbered 30). If the target video frame is the $28^{th}$ video frame, i.e. the video frame numbered 28, the video frames numbered 1 to 27 are the historical video frames before the target video frame (i.e. the video frame numbered 28).

In step 102, a first moving distance of each of the video frames relative to a previous video frame in a preset direction is determined.

That is, the first moving distances of the target video frame and the plurality of historical video frames relative to previous video frames in the preset direction are determined.

The first moving distance between each two adjacent video frames in the preset distance is determined to determine the first moving distance in the preset direction for each individual video frame. The preset direction can be a horizontal direction, a vertical direction, both the horizontal direction and the vertical direction, or a direction between the horizontal direction and the vertical direction.

As a possible implementation, an affine transformation matrix between any pair of adjacent video frames is determined, and the first moving distance of a latter video frame relative to a former video frame in the preset direction is determined based on the affine transformation matrix.

In step 103, an amplitude and a period of the target video frame in the preset direction are determined based on the first moving distances of the video frames in the preset direction.

A movement trajectory in the preset direction is determined for the video frames based on the first moving distances of the video frames relative to the previous video frames in the preset direction. The amplitude and the period of the target video frame in the preset direction are determined based on the movement trajectory. It is determined whether there is a jitter in the target video frame based on the amplitude and period. By considering factors that are used for determining whether the target video frame has a jitter, the accuracy of determining the jitter in the video is improved.

In step 104, in response to the amplitude of the target video frame in the preset direction being greater than an amplitude threshold and the period of the target video frame in the preset direction being less than a period threshold, it is determined that there is a jitter in the video.

In the disclosure, according to the amplitude and the period of the target video frame in the preset direction, it is determined that the target video frame has a jitter in response to the amplitude being greater than the amplitude threshold and the period being less than the period threshold, and further it is determined that the video containing the target video frame has a jitter. Compared with the method for determining whether a video has a jitter based on the amplitude in the relate art, the disclosure avoids the misjudgment of the jitter when a large amplitude is caused by the back and forward movement of the video recording device, and improves the accuracy of video jitter determination.

In the disclosure, the acquisition, storage, and application of the user's personal information involved are in compliance with relevant laws and regulations, and does not violate public order and good customs.

In the method according to examples of the disclosure, the target video frame and the plurality of historical video frames before the target video frame are obtained, the first moving distances of the video frames relative to the previous video frames in the preset direction are determined, the amplitude and the period of the target video frame in the preset direction are determined based on the first moving distances of the video frames relative to the previous video frames in the preset direction; and it is determined that the video has a jitter in response to the amplitude of the target video frame in the preset direction being greater than the amplitude threshold and the period of the target video frame in the preset direction being less than the period threshold. In the disclosure, the jitter conditions of the video frames are determined based on the jitter amplitudes and periods of the video frames, which avoids misjudgment of jitter and improves the accuracy of video jitter detection.

Figure 2:
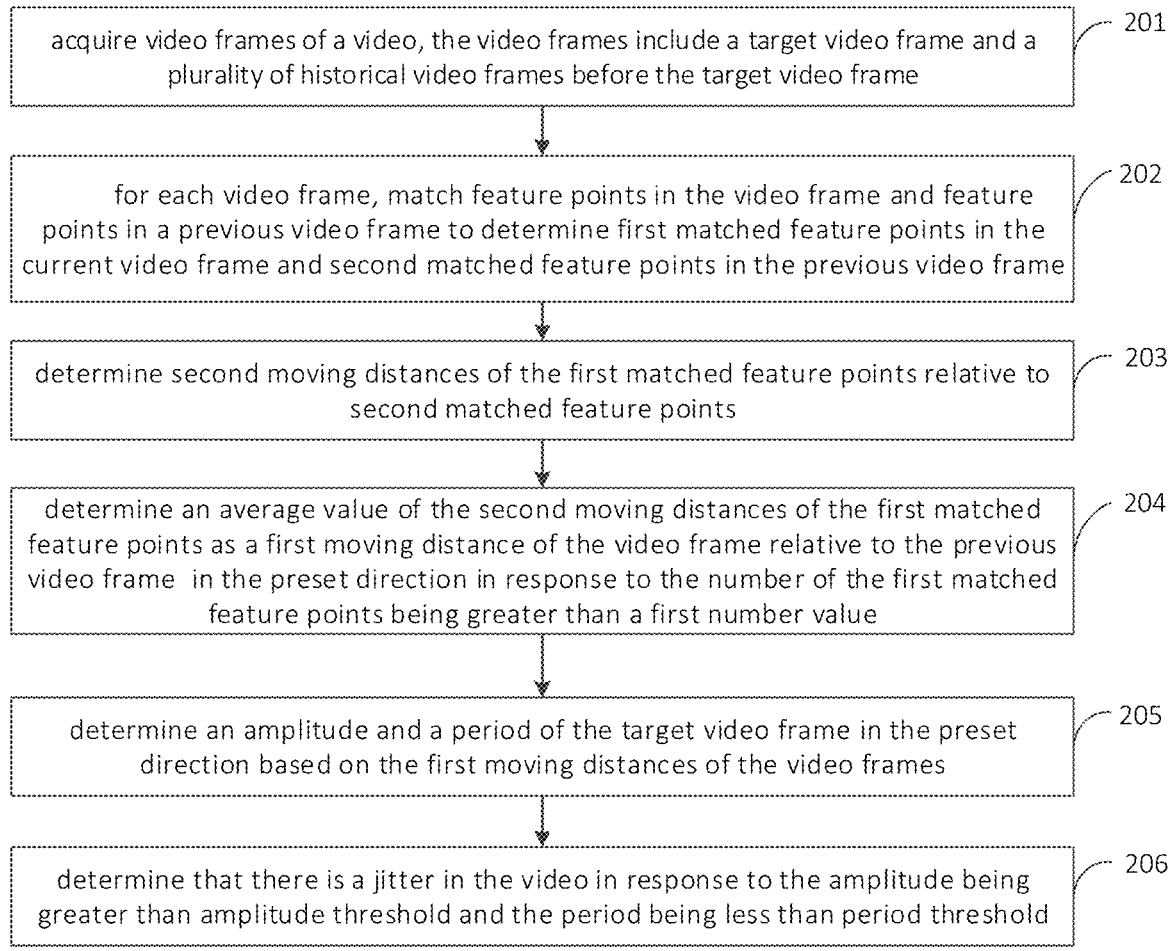
FIG. 2 is a flowchart illustrating another method for detecting a jitter in a video according to examples of the disclosure.

On the basis of the above examples and embodiments, another method for detecting a jitter in a video is provided. FIG. 2 is a flowchart illustrating another method for detecting a jitter in a video according to examples of the disclosure to describe how to obtain the first moving distances of the video frames relative to the previous video frames in the preset direction. As illustrated in FIG. 2, the method includes the following steps.

In step 201, video frames of a video are acquired. The video frames include a target video frame and a plurality of historical video frames before the target video frame.

Reference may be made to the explanation in the foregoing examples and embodiments, the principle is the same, and the details are not repeated here.

In step 202, for each of the video frames, feature points in the video frame are matched with feature points in a previous video frame to determine first matched feature points in the video frame and second matched feature points in the previous video frame.

The feature points may be a set of one or more pixels including the shape, color, texture of an object and other features in the video.

In an implementation, two adjacent video frames are acquired, and features of feature points are extracted from a former and a latter video frame. In this example, the latter video frame is the above-mentioned "the video frame" and the former video frame is the above-mentioned "previous video frame". For example, the features can be extracted based on a Speed-up Robust Features (SURF) algorithm. Matched feature points in the former and latter video frames are obtained by matching the features of the feature points, to form pairs of matched feature points. In order to facilitate the distinction of these matched feature points, the matched feature points in the video frame are referred to as the first matched feature points and the matched feature points in the previous video frame that matches the first matched feature points are referred to as the second matched feature points. For example, the feature points in a video frame (i.e., the first matched feature points) are respectively P1, P2, P3 . . . ., Pn, and the corresponding feature points in the previous video frame (i.e., the second matched feature points) matching the features points in the video frame are respectively Q1, Q2, Q3 . . . , Qn. The feature point P1 and the feature point Q1 form a pair of matched feature points, the feature point P2 and the feature point Q2 form a pair of matched feature points, the feature point P3 and the feature point Q3 form a pair of matched feature points, and so on. The Brute Force or Fast Library for Approximate Nearest Neighbors (FLANN) algorithms can be used to perform feature matching to achieve the matching between the feature points. The FLANN algorithm determines whether a ratio of the closest matching distance to the next closest matching distance exceeds a preset threshold, and determines that the matching is successful in response to the ratio exceeding the preset threshold, thereby reducing pairs of mismatched points.

In step 203, second moving distances of the first matched feature points relative to the second matched feature points in the preset direction are determined.

The preset direction is the horizontal direction and/or the vertical direction. Since the jitter of a camera device that is configured to capture images may be the jitter caused by the movement in the horizontal direction or in the vertical direction, or both in the horizontal direction and the vertical direction, determining the second moving distances in the two directions can improve the accuracy of subsequent jitter determination.

In the disclosure, moving distance of each first matched feature point in the preset direction and moving distance of each second matched feature point in the preset direction are determined so as to determine the second moving distances of the first matched feature points relative to the second matched feature points.

In step 204, in response to the number of the first matched feature points being greater than a first number value, an average value of the second moving distances of the first matched feature points is determined as the first moving distance of the video frame relative to the previous video frame in the preset direction.

The number of the first matched feature points is determined, and the determined number is compared with the first number value to determine whether the number of the first matched feature points is greater than the first number value. Therefore, the misjudgment caused by the error of matching the feature points when the number of the first matched feature points is small can be avoided, thereby improving the accuracy. Further, the average value of the second moving distances of the first matched feature points is determined as the first moving distance of the video frame relative to the previous video frame in the preset direction.

It is understandable that in response to the number of the first matched feature points being less than or equal to the first number value, it is considered that the video frame has not moved relative to the previous video frame in the preset direction.

In step 205, an amplitude and a period of the target video frame in the preset direction are determined based on the first moving distances of the video frames relative to the previous video frames in the preset direction.

In step 206, in response to the amplitude of the target video frame in the preset direction being greater than an amplitude threshold and the period of the target video frame in the preset direction being less than a period threshold, it is determined that there is a jitter in the video.

For the step 205 and step 206, reference may be made to the explanations in the foregoing examples and embodiments, and the principles are the same, which are not repeated here.

In the method for detecting a jitter in a video according to examples of the disclosure, the target video frame and the plurality of historical vide frames before the target video frame are acquired, the first moving distance of each of the video frames relative to the previous video frame in the preset direction is determined, the amplitude and the period of the target video frame in the preset direction are determined based on the first moving distances of the video frames relative to the previous video frames, and it is determined that there is a jitter in the video in response to the amplitude of the target video frame in the preset direction being greater than the amplitude threshold and the period of the target video frame in the preset direction being less than the period threshold. By determining the jitter conditions of the video frames based on the jitter amplitudes and the periods of the video frames, the misjudgment of jitter can be avoided and the accuracy of video jitter detection can be improved. In determining the first moving distance of each video frame relative to the previous video frame in the preset direction, the total number of the matched feature points in the video frame is determined, the misjudgment caused by the error of matching the feature points is reduced, and the accuracy of the determination of the moving distance of each video frame is improved.

Figure 3:
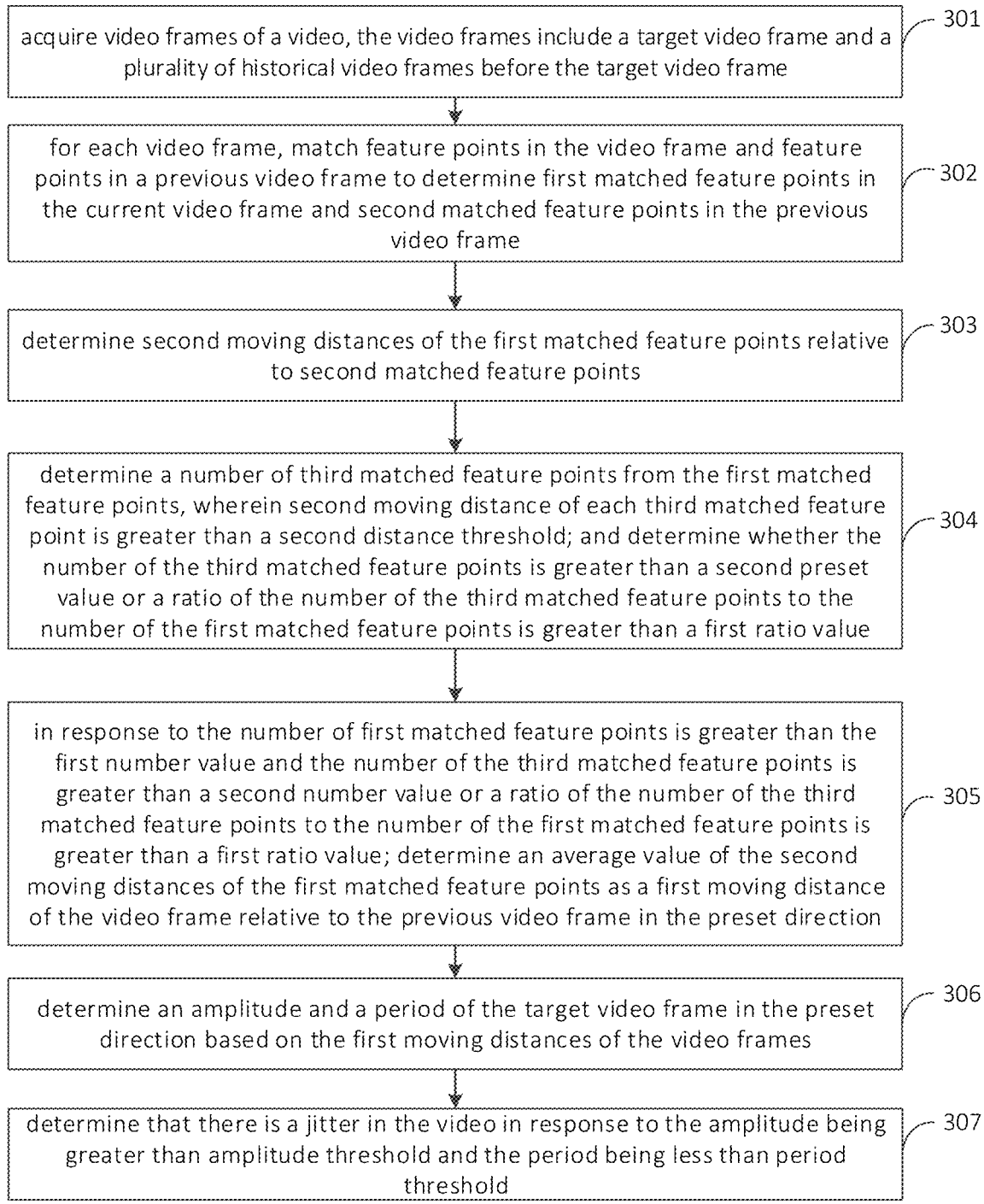
FIG. 3 is a flowchart illustrating another method for detecting a jitter in a video according to examples of the disclosure.

On the basis of the above-mentioned examples and embodiments, another method for detecting a jitter in a video is provided. For each of the video frames, determining the number of matched feature points whose second moving distances are greater than a second distance threshold can improve the accuracy of determining the first moving distance of the video frame relative to the previous video frame in the preset direction. FIG. 3 is a flowchart illustrating another method for detecting a jitter in a video according to examples of the disclosure. As illustrated in FIG. 3, the method further includes the following steps.

In step 301, video frames of a video are obtained. The video frames include a target video frame and a plurality of historical video frames before the target video frame.

In step 302, for each of the video frames, feature points in the video frame are matched with feature points in a previous video frame of the video frame to obtain first matched feature points in the video frame and second matched feature points in the previous video frame of the video frame.

In step 303, second moving distances of the first matched feature points relative to the second matched feature points are determined.

The steps 301-303 can refer to the explanations in the foregoing examples and embodiments, and the principles are the same, which are not repeated here.

In step 304, the number of third matched feature points are determined from the first matched feature points, each of the second moving distances of the third matched feature points is greater than a second distance threshold, and it is determine whether the number of third matched feature points is greater than a second number value or a ratio of the number of third matched feature points to the number of first matched feature point is greater than a first ratio value.

For each video frame, the number of the third matched feature points, among the first matched feature points of the video frame, whose second moving distances are greater than the second distance threshold is determined, and it is determined whether the number of the third matched feature points is greater than the second number value or the proportion of the number of the third matched feature points to the number of the first matched feature points is greater than the first ratio value. By determining, among the first matched feature points of each video frame, the number or the proportion of the feature points each having a relative large second moving distance, it can be determined that there are a large number of feature points in video frames that have moved, to avoid the misjudgment of the movement of the video frame because of the movement of some objects in the video frame, thereby improving the accuracy of the judgment of the movement of the video frame.

It is noteworthy that in response to the number of the third matched feature points being less than or equal to the second number value or the ratio of the number of the third matched feature points to the number of the first matched feature points being less than or equal to the first ratio value, it is considered that some objects in the video move, and the video frame does not move relative to the previous video frame.

In step 305, in response to the number of the first matched feature points being greater than a first number value and the number of the third matched feature points being greater than the second number value or in response to the number of the first matched feature points being greater than the first number value and the ratio of the number of the third matched feature points to the number of the first matched feature points being greater than the first ratio value, the average value of the second moving distances of the first matched feature points is determined as the first moving distance of the video frame relative to the previous video frame in the preset direction.

In response to the number of the first matched feature points contained in a video frame being greater than the first number value and the number of the third matched feature points contained in the video frame being greater than the second number value or in response to the number of the first matched feature points contained in a video frame being greater than the first number value and the ratio of the number of the third matched feature points contained in the video frame to the number of the first matched feature points being greater than the first ratio value, it is determined that there is a jitter in the video frame. Therefore, the average value of the second moving distances of the first matched feature points of the video frame is determined as the first moving distance of the video frame relative to the previous video frame of the video frame in the preset direction, thereby improving the accuracy of the judgement of the movement of each video frame.

In step 306, an amplitude and a period of the target video frame in the preset direction are determined based on the first moving distances of the video frames relative to the previous video frames.

In step 307, in response to the amplitude of the target video frame in the preset direction being greater than an amplitude threshold and the period of the target video frame in the preset direction being less than a period threshold, it is determined that there is jitter in a video.

For the step 306 and step 307, reference may be made to the explanations in the foregoing examples and embodiments, and the principles are the same, where are not repeated here.

In the method for detecting a jitter in a video according to examples of the disclosure, the target video frame and the plurality of historical video frames before the target video frame are obtained, the first moving distances of the video frames relative to the previous video frames in the preset direction are determined, the amplitude and the period of the target video frame in the preset direction are determined based on the first moving distances of the video frames relative to the previous video frames; and it is determined that there is a jitter in a video in response to the amplitude of the target video frame in the preset direction being greater than the amplitude threshold and the period of the target video frame in the preset direction being less than the period threshold. In the disclosure, the jitter conditions of the video frames are determined based on the jitter amplitudes and the periods of the video frames, which avoids the misjudgment of jitter and improves the accuracy of the video jitter detection. In determining the first moving distance of each video frame relative to the corresponding previous video frame in the preset direction, by determining the total number of the matched feature points in the video frame, determining whether the second moving distances of the feature points meet a preset condition or determining whether the number of the feature points that have moved satisfies a preset condition, the misjudgment caused by the movement of some objects in the video frame is reduced, and the accuracy of the determination of the moving distance of each video frame is improved.

Figure 4:
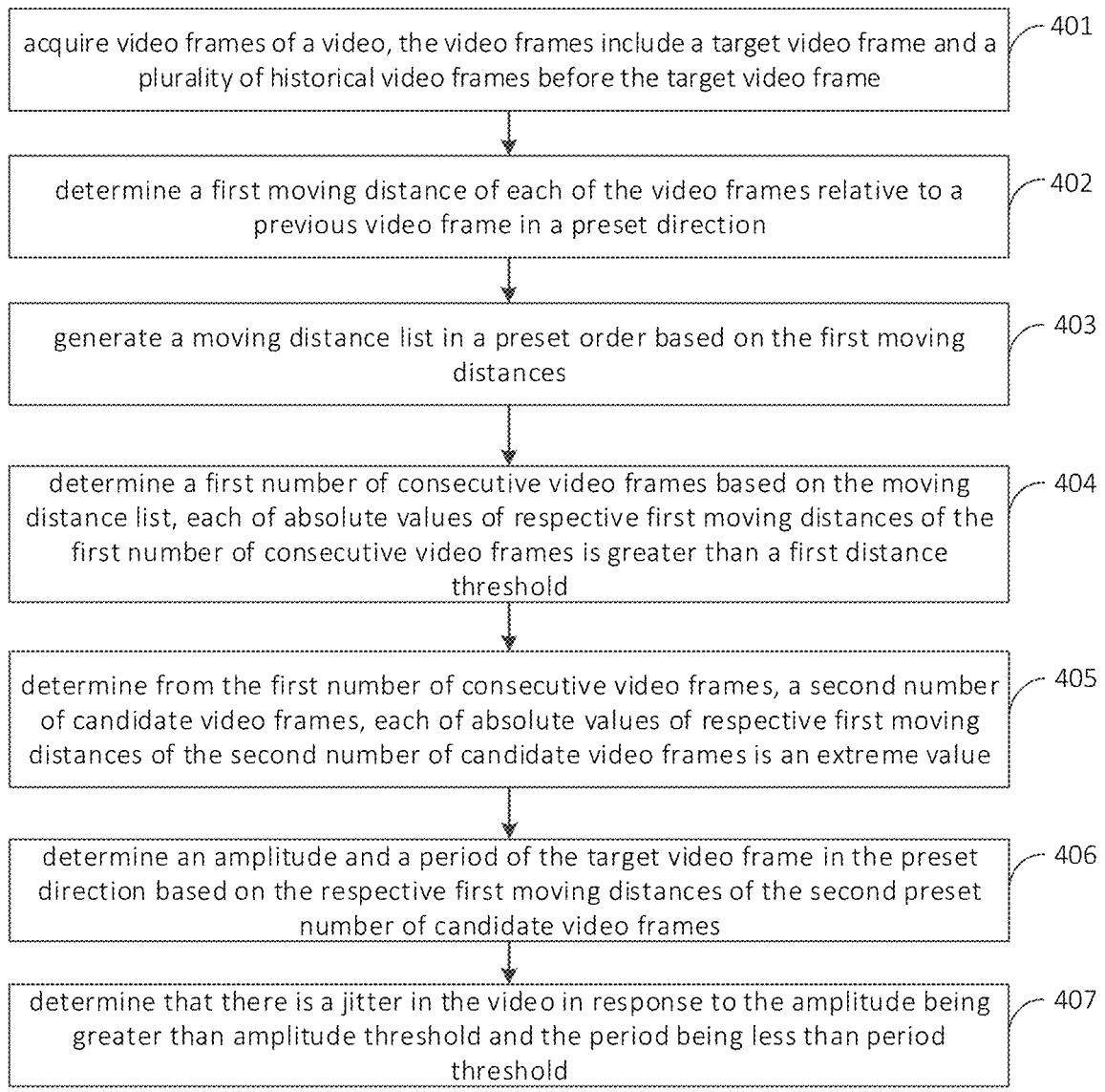
FIG. 4 is a flowchart illustrating another method for detecting a jitter in a video according to examples of the disclosure.

On the basis of the foregoing examples and embodiments, another method for detecting a jitter in a video is provided. FIG. 4 is a flowchart illustrating another method for detecting a jitter in a video according to examples of the disclosure. As illustrated in FIG. 4, the method includes the following steps.

In step 401, video frames of a video are acquired. The video frames include a target video frame and a plurality of historical video frames before the target video frame.

In step 402 a first moving distance of each of the video frames relative to a previous video frame in a preset direction is determined.

For the step 401 and step 402, reference may be made to the relevant explanations in the foregoing examples and embodiments, and the principles are the same, which are not repeated here.

In step 403, a moving distance list is generated in a preset order according to the first moving distances.

The preset order is configured to indicate a generation order in which the video frames are generated.

The first moving distances of the video frames relative to the previous video frames in the preset direction are written in sequence into the moving distance list based on the generation order of the video frames. For example, there are a total of 10 video frames which are numbered 1 to 10 according to the generation order in which the 10 video frames are generated. In the time domain, the video frame numbered 10 is the most recently generated video frame, the video frame numbered 9 is a previous one of the video frame numbered 10 (that is the video frame numbered 9 is generated previously just before the video frame numbered 10), the video frame numbered 8 is a previous one of the video frame numbered 9 (that is the video frame numbered 8 is generated previously just before the video frame numbered 9), . . . and the video frame numbered 1 is the earliest generated vide frame. Therefore, the moving distances in the preset direction of the video frames numbered 1 to 10 are written from left to right into the moving distance list. That is, the first moving distance of the video frame numbered 1 is the earliest written into the moving distance list, next to writing the first moving distance of the video frame numbered 1, the first moving distance of the video frame numbered 2 is written into the moving distance list . . . and the first moving distance of the video frame numbered 10 is the latest written into the moving distance list.

When the number of first moving distances of the video frames included in the moving distance list is greater than a first number threshold, since the moving distance list is used to filter the video frames that are subsequently used to determine the amplitude and the period of the target video frame, the video frames that are generated earlier are deleted to reduce the number of first moving distances included in the moving distance list, thereby reducing the amount of calculation, and increasing the accuracy of determining the amplitude and the period of the target video frame based on the first moving distances of the video frames included in the moving distance list.

In step 404, a first number of consecutive video frames are determined based on the moving distance list, in which each of absolute values of the first moving distances of the first number of consecutive video frames is greater than a first distance threshold.

From the moving distance list, in a reverse of the preset order, a first number of consecutive video frames are determined, where each of the absolute values of the first moving distances of the first number of consecutive video frames is greater than the first distance threshold to exclude the video frames with small or no movement and determine effective consecutive video frames, thereby reducing the number of the consecutive video frames that are used to determine the amplitude and period of the target video frame in the preset direction and improving the accuracy.

For example, in the moving distance list, the video frames are checked from the video frame numbered 10 to the video frame numbered 1 to determine a first number of continuous video frames where each of the absolute values of the first moving distances of the first number of continuous video frames is greater than the first distance threshold. As an example, 10 continuous video frames are determined.

In step 405, from the first number of consecutive video frames, a second number of candidate video frames are determined, in which an absolute value of the first moving distance of each candidate video frame is an extreme value.

The second number is less than the first number. For example, the first number equals to 10 and the second number equals to 3.

The second number of candidate video frames are determined, where the absolute value of the first moving distance of each candidate video frame is an extreme value, that is, the points having local extreme values among the absolute values of a plurality of first moving distances are determined to further filter the first moving distances.

For example, the second number of candidate video frames (such as 3 candidate video frames) can be determined from 10 continuous video frames determined in the previous step, where the first moving distance of each candidate video frame is a point having the local extreme value.

In step 406, the amplitude and the period of the target video frame in the preset direction are determined based on the first moving distances of the second number of candidate video frames.

The first moving distances of the second number of candidate video frames are relatively large, indicating that it is possible that each candidate video frame may have a jitter. Therefore, the amplitude and the period of the target video frame in the preset direction can be estimated based on the first moving distances of the second number of candidate video frames that may have a jitter in the preset direction, to whether the target video frame is jittered based on the amplitude and the period, thereby improving the accuracy of the jitter determination of the target video frame.

In an implementation, among the second number of candidate video frames, a reference video frame is determined based on first moving distances of adjacent candidate video frames in the preset direction. In one scenario, if the second number is greater than or equal to 2, pairs of candidate video frames having an adjacent relationship are determined from the second number of candidate video frames and a candidate video frame having a smaller first moving distance is selected from each pair of candidate video frames having the adjacent relationship. The above selection operation is repeated until there are two candidate video frames left. From the two candidate video frames finally screened out, a candidate video frame with a larger first moving distance is selected as the reference video frame.

For example, there are 3 candidate video frames, which are respectively A, B, and C according to the order of the moving distance list. The first moving distance of the candidate video frame A is the largest, and the first moving distance of the candidate video frame B is greater than the first moving distance of the candidate video frame C. The absolute value of first moving distance of the candidate video frame C is compared with the absolute value of the first moving distance of the candidate video frame B to determine that candidate video frame C has the smaller first moving distance; and the absolute value of the first moving distance of the candidate video frame B is compared with the absolute value of the first moving distance of the candidate video frame A to determine that the candidate video frame B has the smaller first moving distance. Then, the reference video frame is selected from the candidate video frame C and the candidate video frame B. By comparing the first moving distance of the candidate video frame C and the first moving distance of the candidate video frame B, the candidate video frame B with the larger first moving distance can be determined as the reference video frame.

In another scenario, if the second number equals to 1, the candidate video frame corresponding to the one point having the extreme value is determined as the reference video frame. When there is one reference video frame, the amplitude and the period of the target video frame in the preset direction are both 0, and it is determined that there is no jitter in the video.

Further, the first moving distance of the target video frame in the preset direction is determined as the amplitude of the target video frame in the preset direction. The period of the target video frame in the preset direction is determined based on a frame difference between the reference video frame and a candidate video frame adjacent to the reference video frame.

In one scenario, if there are two candidate video frames adjacent to the reference video frame, a frame interval between the reference video frame and any candidate video frame adjacent to the reference video frame is determined and a period, such as T1 or T2, between the reference video frame and any candidate video frame adjacent to the reference video frame is determined based on the frame interval. The determined T1 or T2 can be used as the period of the target video frame, or an average value of T1 and T2 is used as the period of the target video frame.

The determination method of T1 or T2 will be described by taking T1 as an example. In this example, the reference video frame is the above-determined candidate video frame B and there are 3 video frames between the candidate video frame B and the candidate video frame A, that is, the frame interval between the candidate video frame B and the candidate video frame A is 3. The shooting frame rate of the device that collects the target video frame is obtained and a duration (such as t1) of one video frame is determined based on the shooting frame rate. Two times of the duration of one frame is determined as the period between the reference video frame B and the candidate video frame A adjacent to the reference video frame B, i.e. t1*3*2.

In another scenario, if there is one candidate video frame adjacent to the reference video frame, the period determined according to the frame interval between the reference video frame and the adjacent candidate video frame is determined as the period of the target video frame.

Further, it can be accurately determined whether the target video frame is jittered based on the amplitude and period of the target video frame, which improves the accuracy of the jitter determination. In the disclosure, when the value of the second number is large, the reference video frame can be iteratively screened out from the second number of candidate video frames, and the amplitude of the target video frame is determined based on the first moving distance of the reference video frame to increase the accuracy of the determination of the amplitude and the period is determined based on the frame interval between the reference video frame and the adjacent video frame to improve the accuracy of the estimation of the period.

In step 407, in response to the amplitude of the target video frame in the preset direction being greater than an amplitude threshold and the period of the target video frame in the preset direction being less than a period threshold, it is determined that the video has a jitter.

Reference may be made to the explanations in the foregoing examples and embodiments, and details are not repeated here.

In the method for detecting a jitter in a video according to examples of the disclosure, the target video frame and the plurality of historical video frames before the target video frame are acquired, and the first moving distance of each of the video frame relative to the previous video frame in the preset distance is determined, the amplitude and the period of the target video frame in the preset direction are determined based on the first moving distances of the video frames relative to the previous video frames in the preset direction; and it is determined that there is a jitter in a video in response to the amplitude of the target video frame in the preset direction being greater than the amplitude threshold and the period of the target video frame in the preset direction being less than the period threshold. In the disclosure, the jitter conditions of the video frames are determined based on the jitter amplitudes and the periods of the video frames, which avoids misjudgment of jitter and improves the accuracy of video jitter detection.

The foregoing examples and embodiments illustrate that when the amplitude of the target video frame in the preset direction is greater than the amplitude threshold and the period of the target video frame in the preset direction is less than the period threshold, it is determined that the target video frame has a jitter, thereby determining that the video has a jitter. In order to improve the accuracy of video jitter determination, based on the above-mentioned examples and embodiments, another method for detecting a jitter in a video is provided. In this method, after determining that the target video frame has a jitter, a plurality of consecutive video frames after the target video frame are acquired and respective amplitudes and respective periods of the plurality of consecutive video frames after the target video frame in the preset direction are determined with the above-mentioned methods. In addition, the number of continuous video frames that each has a jitter is determined based on the amplitudes and the periods of the consecutive video frames in the preset direction. It can be determined that there is a jitter in the video in response to the number of the continuous video frames that each has a jitter is greater than a third number value. In the disclosure, by determining the jitter conditions of the plurality of consecutive video frames, it is possible to determine the video frames that each has a jitter from the video and determine a starting time and an ending timer of the jitter in the video, thereby accurately determining the video part with the jitter, improving the accuracy of video jitter determination and providing a basis for subsequent jitter elimination and jitter analysis.

In order to implement the foregoing embodiments, there is further provided an apparatus for detecting a jitter in a video.

Figure 5:
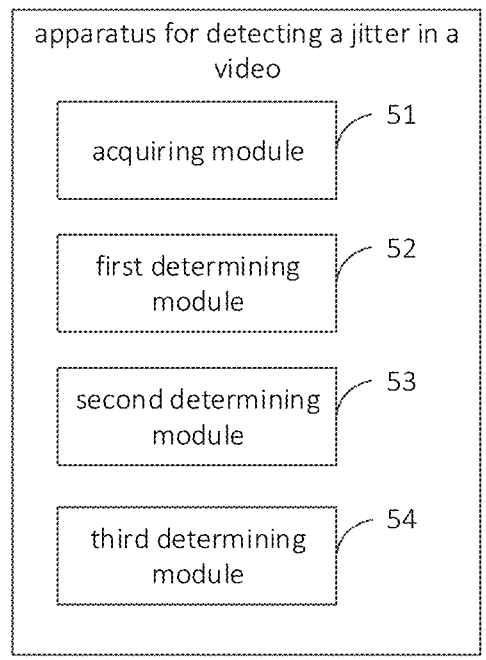
FIG. 5 is a block diagram illustrating an apparatus for detecting a jitter in a video according to examples of the disclosure.

FIG. 5 is a block diagram illustrating an apparatus for detecting a jitter in a video according to examples of the disclosure. As illustrated in FIG. 5, the apparatus includes an acquiring module 51, a first determining module 52, a second determining module 53, and a third determining module 54.

The acquiring module 51 is configured to acquire video frames of a video. The video frames include a target video frame and a plurality of historical video frames before the target video frame.

The first determining module 52 is configured to determine a first moving distance of each of the video frames relative to a previous video frame in a preset direction.

The second determining module 53 is configured to determine an amplitude and a period of the target video frame in the preset direction based on the first moving distances of the video frames relative to the previous video frames.

The third determining module 54 is configured to determine that the video has a jitter in response to the amplitude of the target video frame in the preset direction being greater than an amplitude threshold and the period of the target video frame in the preset direction being less than a period threshold.

Further, in an implementation, the second determining module 53 is further configured to generate a moving distance list in a preset order based on the first moving distances. The preset order is configured to indicate a generation order in which the video frames are generated.

The second determining module 53 is further configured to determine a first number of consecutive video frames based on the moving distance list, in which each of absolute values of the first moving distances of the first number of consecutive video frames is greater than a first distance threshold, and determine a second number of candidate video frames from the first number of consecutive video frames, in which each of absolute values of the first moving distances of the second number of consecutive video frames is an extreme value and the second number is less than the first number. The third determining unit is configured to determine the amplitude and the period of the target video frame in the preset direction based on the first moving distances of the second number of candidate video frames in the preset direction.

In an implementation, the second determining module 53 is further configured to determine a reference video frame based on the first moving distances of adjacent candidate video frames in the second number of candidate video frames in the preset direction; determine the first moving distance of the reference video frame in the preset direction as the amplitude of the target video frame in the preset direction; and determine the period of the target video frame in the preset direction based on a frame different between the reference video frame and a candidate video frame adjacent to the reference video frame.

In an implementation, the first determining module 52 is further configured to, match feature points in each video frame and feature points in a previous video frame of the video frame to determine first matched feature points in the video frame and second matched feature points in the previous video frame; determine second moving distances between the first matched feature points and the second matched feature points; and determine an average value of second moving distances of the first matched feature points as the first moving distance of the video frame relative to the previous video frame in the preset direction in response to the number of the first matched feature points being greater than a first number value.

In an implementation, the first determining module 52 is further configured to determine the number of third matched feature points from the first matched feature points, where each of second moving distances of the third matched feature points is greater than a second distance threshold; and determine that the number of the third matched feature points is greater than a second number value or a ratio of the number of the third matched feature points to the number of the first matched feature points is greater than a first ratio value.

In an implementation, the third determining module 54 is further configured to acquire consecutive video frames after the target video frame; determining the number of continuous video frames that each has a jitter based on amplitudes and periods of the consecutive video frames in the preset direction; and determine that there is a jitter in the video in response to the number of the continuous video frames that each has a jitter being greater than a third number value.

In an implementation the preset direction includes a horizontal direction and/or a vertical direction.

It is understandable that the explanations in the foregoing method embodiments are also applicable to the device in this embodiment, and the principle is the same, which are not repeated here.

In the apparatus for detecting a jitter in a video according to the examples of the disclosure, the target video frame and the plurality of historical video frames before the target video frame are obtained, the first moving distance of each of the video frames relative to the previous video frame in the preset direction is determined, the amplitude and the period of the target video frame in the preset direction are determined based on the first moving distances of the video frames relative to the previous video frames in the preset direction; and it is determined that the video has a jitter in response to the amplitude of the target video frame in the preset direction being greater than the amplitude threshold and the period of the target video frame in the preset direction being less than the period threshold. In the disclosure, the jitter conditions of the video frames are determined based on the jitter amplitudes and periods of the video frames, which avoids misjudgment of jitter and improves the accuracy of video jitter detection.

In order to implement the foregoing examples and embodiments, there is further provided an electronic device, including: at least one processor; and a memory communicatively connected with the at least one processor. The memory stores instructions executable by the at least one processor. The instructions are executed by the at least one processor to cause the at least one processor to execute the steps of the method described in the foregoing examples and embodiments.

In order to implement the above-mentioned examples and embodiments, there is provided a non-transitory computer-readable storage medium having computer instructions stored thereon. The computer instructions are configured to cause a computer to execute the steps of the method described in the foregoing examples and embodiments.

In order to implement the foregoing examples and embodiments, there is provided a computer program product, including computer instructions. When the computer instructions are executed by a processor, the steps of the method described in the foregoing examples and embodiments are performed.

According to examples of the disclosure, there are further provided an electronic device, a readable storage medium, and a computer program product.

Figure 6:
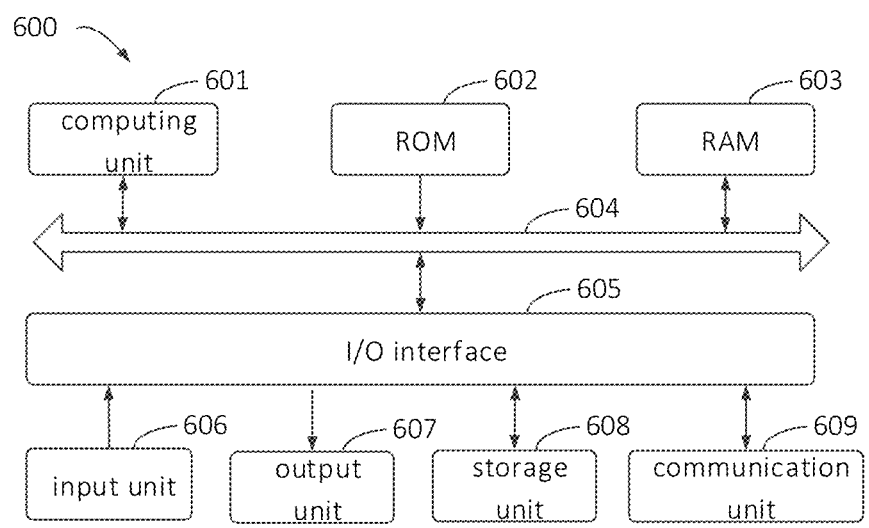
FIG. 6 is a block diagram illustrating an electronic device 600 according to examples of the disclosure.

FIG. 6 is a block diagram illustrating electronic device 600 according to examples of the disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processors, cellular phones, smart phones, wearable devices, and other similar computing devices. The components, their connections and relationships, and their functions shown herein are examples only, and are not intended to limit implementations of the disclosure described and/or claimed herein.

As illustrated in FIG. 6, the electronic device 600 includes a computing unit 601 which can perform various suitable actions and processes based on computer programs stored in a read only memory (ROM) 602 or computer programs loaded from a storage unit 608 into a random access memory (RAM) 603. In the RAM 603, various programs and data necessary for the operation of the electronic device 600 can also be stored. The computing unit 601, the ROM 602, and the RAM 603 are connected to each other through a bus 604. An input/output (I/O) interface 605 is also connected to the bus 604.

Various components in the electronic device 600 are connected to the I/O interface 605, including: an input unit 606, such as a keyboard, a mouse, etc.; an output unit 607, such as various types of displays, speakers, etc.; a storage unit 608, such as a magnetic disk, an optical disk etc.; and a communication unit 609, such as a network card, modem, wireless communication transceiver, and the like. The communication unit 609 allows the electronic device 600 to exchange information/data with other devices through a computer network such as the Internet and/or various telecommunication networks.

The computing unit 601 may be a variety of general-purpose and/or special-purpose processing components having processing and computing capabilities. Some examples of the computing unit 601 include, but are not limited to, central processing units (CPUs), graphics processing units (GPUs), various specialized artificial intelligence (AI) computing chips, various computing units that run machine learning model algorithms, digital signal processing processor (DSP), and any suitable processor, controller, microcontroller, etc. The computing unit 601 executes the various methods and processes described above, such as the method for detecting a jitter in a video. For example, in some embodiments, the method for detecting a jitter in a video may be implemented as a computer software program tangibly embodied on a machine-readable medium, such as storage unit 608. In some embodiments, part or all of the computer program may be loaded and/or installed on the electronic device 600 via the ROM 602 and/or the communication unit 609. When the computer program is loaded into RAM 603 and executed by computing unit 601, one or more steps of the method described above may be performed. Alternatively, in other embodiments, the computing unit 601 may be configured to perform the method by any other suitable means (e.g., by means of firmware).

Various implementations of the systems and techniques described herein above may be implemented in digital electronic circuitry, integrated circuit systems, field programmable gate arrays (FPGAs), application specific integrated circuits (ASICs), application specific standard products (ASSPs), systems on chips system (SOC), load programmable logic device (CPLD), computer hardware, firmware, software, and/or combinations thereof. These various implementations may include being implemented in one or more computer programs that are executable and/or interpretable on a programmable system including at least one programmable processor. The programmable processor may be a special purpose or general-purpose programmable processor, may receive data and instructions from a storage system, at least one input device, and at least one output device, and transmit data and instructions to the storage system, the at least one input device, and the at least one output device.

Program codes for implementing the methods of the disclosure may be written in any combination of one or more programming languages. These program codes may be provided to a processor or controller of a general purpose computer, special purpose computer or other programmable data processing apparatus, such that the program codes, when executed by the processor or controller, cause the processor or the controller to perform the functions/functions specified in the flowcharts and/or block diagrams. The program codes may execute entirely on the machine, partly on the machine, partly on the machine and partly on a remote machine as a stand-alone software package, or entirely on the remote machine or server.

In the context of the disclosure, the machine-readable medium may be a tangible medium that may contain or store a program for use by or in connection with the instruction execution system, apparatus or device. The machine-readable medium may be a machine-readable signal medium or a machine-readable storage medium. The machine-readable media may include, but are not limited to, electronic, magnetic, optical, electromagnetic, infrared, or semiconductor systems, devices, or devices, or any suitable combination of the foregoing. More specific examples of machine-readable storage media would include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination of the foregoing.

To interact with users, the systems and techniques described herein may be implemented on a computer having: a display device (e.g. a cathode ray tube (CRT) or liquid crystal display (LCD) monitor) for displaying information to the users; and a keyboard and pointing device (e.g. a mouse or a trackball) through which the users can provide input to the computer. Other kinds of devices can also be used to provide interaction with the user. For example, the feedback provided to the user can be any form of sensory feedback (e.g. visual feedback, auditory feedback, or tactile feedback) and can be in any form (including acoustic input, voice input, or tactile input) to receive input from the users.

The systems and techniques described herein can be implemented on a computing system (e.g. as a data server) that includes back-end components, or a computing system (e.g. as an application server) that includes middleware components, or a computing system (e.g. a user computer having a graphical user interface or web browser through which the users can interact with implementations of the systems and techniques described herein) that includes front-end components, or a computer system including a combination of such backend components, middleware components and front-end components. The components of the system may be interconnected by any form or medium of digital data communication (e.g. a communication network). Examples of communication networks include: Local Area Networks (LANs), Wide Area Networks (WANs), the Internet, and blockchain networks.

The computer system can include clients and servers. The clients and servers are generally remote from each other and usually interact through a communication network. The relationship of client and server arises by computer programs running on the respective computers and having a client-server relationship to each other. The server can be a cloud server, also known as a cloud computing server or a cloud host, which is a host product in the cloud computing service system to solve the problem of traditional physical hosts and VPS services ("Virtual Private Server", or "VPS" for short), and there are the defects of difficult management and weak business expansion. The server can also be a server of a distributed system, or a server combined with a blockchain.

It is noteworthy that artificial intelligence (AI) is the study of making computers to simulate certain thinking processes and intelligent behaviors of people (such as learning, reasoning, thinking, planning, etc.), including both hardware-level technologies and software-level technologies. The AI hardware technologies generally include technologies such as sensors, specific-purposed AI chips, cloud computing, distributed storage, and big data processing. The AI software technologies mainly include computer vision technology, speech recognition technology, natural language processing technology, and machine learning/depth learning, big data processing technology, knowledge graph technology and other major directions.

It is understandable that steps may be reordered, added or deleted using the various forms of flowchart shown above. For example, the steps described in the disclosure can be executed in parallel, sequentially, or in different orders, as long as the desired results of the technical solutions disclosed in the disclosure can be achieved, no limitation is imposed herein.

The above-mentioned specific examples do not constitute a limitation on the protection scope of the disclosure. It is understandable by those skilled in the art that various modifications, combinations, sub-combinations and substitutions may occur depending on design requirements and other factors. Any modifications, equivalent replacements, and improvements made within the principles of the disclosure should be included within the protection scope of the disclosure.

What is claimed is:

1. A method for detecting a jitter in a video, comprising:
acquiring video frames of a video, wherein the video frames comprise a target video frame and a plurality of historical video frames before the target video frame;
determining a first moving distance of each of the video frames relative to a previous video frame in a preset direction;
determining an amplitude and a period of the target video frame in the preset direction based on the first moving distances of the video frames;

determining that the target video frame has a jitter in response to the amplitude of the target video frame in the preset direction being greater than a amplitude threshold and the period of the target video frame in the preset direction being less than a period threshold; and determining that there is a jitter in the video in response to determining that the target video frame has a jitter;

wherein determining the amplitude and the period of the target video frame in the preset direction comprises:

generating a moving distance list in a preset order based on the first moving distances; wherein the preset order is configured to indicate a generation order in which the video frames are generated;

determining a first number of consecutive video frames based on the moving distance list, wherein each of absolute values of respective first moving distances of the first number of consecutive video frames is greater than a first distance threshold;

determining from the first number of consecutive video frames, a second number of candidate video frames, in which each of the absolute values of respective first moving distances of the second number of candidate video frames is an extreme value, and the second number is less than the first number; and determining the amplitude and the period of the target video frame in the preset direction based on the respective first moving distances of the second number of candidate video frames.

2. The method of claim 1, wherein determining the amplitude and the period of the target video frame in the preset direction based on the respective first moving distances of the second number of candidate video frames comprises:

determining a reference video frame based on first moving distances of adjacent candidate video frames in the second number of candidate video frames;

determining the first moving distance of the reference video frame in the preset direction as the amplitude of the target video frame in the preset direction; and determining the period of the target video frame in the preset direction based on a frame difference between the reference video frame and a candidate video frame adjacent to the reference video frame.

3. The method according to claim 1, wherein determining the first moving distance of each of the video frames relative to a previous video frame comprises:

matching feature points in the video frame and feature points in the previous video frame to determine first matched feature points in the video frame and second matched feature points in the previous video frame;

determining second moving distances of the first matched feature points relative to the second matched feature points; and determining an average value of the second moving distances of the first matched feature points as the first moving distance of the video frame relative to the previous video frame in the preset direction in response to the number of the first matched feature points being greater than a first number value.

4. The method of claim 3, wherein determining the average value of the second moving distances of the first matched feature points as the first moving distance of the video frame relative to the previous video frame in the preset direction comprises:

determining a number of third matched feature points from the first matched feature points, wherein each of second moving distances of the third matched feature points is greater than a second distance threshold; and determining the average value of the second moving distances of the first matched feature points as the first moving distance of the video frame relative to the previous video frame in the preset direction, in response to determining that the number of the third matched feature points is greater than a second number value or a ratio of the number of the third matched feature points to the number of the first matched feature points is greater than a first ratio value.

5. The method of claim 1, wherein determining that there is a jitter in the video in response to determining that the target video frame has a jitter comprises:

acquiring consecutive video frames after the target video frame in response to determining that the target video frame has the jitter;

determining an amplitude and a period of each of the consecutive video frames in the preset direction, wherein determining the amplitude and the period of each of the consecutive video frames is the same as determining the amplitude and the period of the target video frame;

determining a number of consecutive video frames each having a jitter based on the amplitude and the period of each of the consecutive video frames; and determining that there is a jitter in the video in response to the number of consecutive video frames each having a jitter being greater than a third number value.

6. The method of claim 1, wherein the preset direction comprises at least one of a horizontal direction or a vertical direction.

7. An electronic device, comprising:

at least one processor; and a memory communicatively connected with the at least one processor;

wherein, the memory stores instructions executable by the at least one processor, and when the instructions are executed by the at least one processor, the at least one processor is configured to:

acquire video frames of a video, wherein the video frames comprise a target video frame and a plurality of historical video frames before the target video frame;

determine a first moving distance of each of the video frames relative to a previous video frame in a preset direction;

determine an amplitude and a period of the target video frame in the preset direction based on the first moving distances of the video frames;

determine that the target video frame has a jitter in response to the amplitude of the target video frame in the preset direction being greater than a amplitude threshold and the period of the target video frame in the preset direction being less than a period threshold; and determine that there is a jitter in the video in response to determining that the target video frame has a jitter;

wherein the at least one processor is configured to:

generate a moving distance list in a preset order based on the first moving distances; wherein the preset order is configured to indicate a generation order in which the video frames are generated;

determine a first number of consecutive video frames based on the moving distance list, wherein each of absolute values of respective first moving distances of the first number of consecutive video frames is greater than a first distance threshold;

determine from the first number of consecutive video frames, a second number of candidate video frames, in which each of the absolute values of respective first moving distances of the second number of candidate video frames is an extreme value, and the second number is less than the first number; and determine the amplitude and the period of the target video frame in the preset direction based on the respective first moving distances of the second number of candidate video frames.

8. The electronic device of claim 7, wherein the at least one processor is configured to:

determine a reference video frame based on first moving distances of adjacent candidate video frames in the second number of candidate video frames;

determine the first moving distance of the reference video frame in the preset direction as the amplitude of the target video frame in the preset direction; and determine the period of the target video frame in the preset direction based on a frame difference between the reference video frame and a candidate video frame adjacent to the reference video frame.

9. The electronic device according to claim 8, wherein the at least one processor is configured to:

match feature points in the video frame and feature points in the previous video frame to determine first matched feature points in the video frame and second matched feature points in the previous video frame;

determine second moving distances of the first matched feature points relative to the second matched feature points; and determine an average value of the second moving distances of the first matched feature points as the first moving distance of the video frame relative to the previous video frame in the preset direction in response to the number of the first matched feature points being greater than a first number value.

10. The electronic device of claim 9, wherein the at least one processor is further configured to:

determine a number of third matched feature points from the first matched feature points, wherein each of second moving distances of the third matched feature points is greater than a second distance threshold; and determine the average value of the second moving distances of the first matched feature points as the first moving distance of the video frame relative to the previous video frame in the preset direction, in response to determining that the number of the third matched feature points is greater than a second number value or a ratio of the number of the third matched feature points to the number of the first matched feature points is greater than a first ratio value.

11. The electronic device of claim 7, wherein the at least one processor is configured to:

acquire consecutive video frames after the target video frame in response to determining that the target video frame has the jitter;

determine an amplitude and a period of each of the consecutive video frames in the preset direction, wherein determining the amplitude and the period of each of the consecutive video frames is the same as determining the amplitude and the period of the target video frame;

determine a number of consecutive video frames each having a jitter based on the amplitude and the period of each of the consecutive video frames; and determine that there is a jitter in the video in response to the number of consecutive video frames each having a jitter being greater than a third number value.

12. The electronic device of claim 7, wherein the preset direction comprises at least one of a horizontal direction or a vertical direction.

13. A non-transitory computer-readable storage medium, having computer instructions stored thereon, wherein the computer instructions are configured to cause a computer to perform a method comprising:

acquiring video frames of a video, wherein the video frames comprise a target video frame and a plurality of historical video frames before the target video frame;

determining a first moving distance of each of the video frames relative to a previous video frame in a preset direction;

determining an amplitude and a period of the target video frame in the preset direction based on the first moving distances of the video frames;

determining that the target video frame has a jitter in response to the amplitude of the target video frame in the preset direction being greater than a amplitude threshold and the period of the target video frame in the preset direction being less than a period threshold; and determining that there is a jitter in the video in response to determining that the target video frame has a jitter;

wherein determining the amplitude and the period of the target video frame in the preset direction comprises:

generating a moving distance list in a preset order based on the first moving distances; wherein the preset order is configured to indicate a generation order in which the video frames are generated;

determining a first number of consecutive video frames based on the moving distance list, wherein each of absolute values of respective first moving distances of the first number of consecutive video frames is greater than a first distance threshold;

determining from the first number of consecutive video frames, a second number of candidate video frames, in which each of the absolute values of respective first moving distances of the second number of candidate video frames is an extreme value, and the second number is less than the first number; and determining the amplitude and the period of the target video frame in the preset direction based on the respective first moving distances of the second number of candidate video frames.

14. The non-transitory computer-readable storage medium of claim 13, wherein determining the amplitude and the period of the target video frame in the preset direction based on the respective first moving distances of the second number of candidate video frames comprises:

determining a reference video frame based on first moving distances of adjacent candidate video frames in the second number of candidate video frames;

determining the first moving distance of the reference video frame in the preset direction as the amplitude of the target video frame in the preset direction; and determining the period of the target video frame in the preset direction based on a frame difference between the reference video frame and a candidate video frame adjacent to the reference video frame.

15. The non-transitory computer-readable storage medium of claim 13, wherein determining the first moving distance of each of the video frames relative to a previous video frame comprises:
- matching feature points in the video frame and feature points in the previous video frame to determine first matched feature points in the video frame and second matched feature points in the previous video frame;
- determining second moving distances of the first matched feature points relative to the second matched feature points; and
- determining an average value of the second moving distances of the first matched feature points as the first moving distance of the video frame relative to the previous video frame in the preset direction in response to the number of the first matched feature points being greater than a first number value.

16. The non-transitory computer-readable storage medium of claim 15, wherein determining the average value of the second moving distances of the first matched feature points as the first moving distance of the video frame relative to the previous video frame in the preset direction comprises:
- determining a number of third matched feature points from the first matched feature points, wherein each of second moving distances of the third matched feature points is greater than a second distance threshold; and
- determining the average value of the second moving distances of the first matched feature points as the first moving distance of the video frame relative to the previous video frame in the preset direction, in response to determining that the number of the third matched feature points is greater than a second number value or a ratio of the number of the third matched feature points to the number of the first matched feature points is greater than a first ratio value.

17. The non-transitory computer-readable storage medium of claim 13, wherein determining that there is a jitter in the video in response to determining that the target video frame has a jitter comprises:
- acquiring consecutive video frames after the target video frame in response to determining that the target video frame has the jitter;
- determining an amplitude and a period of each of the consecutive video frames in the preset direction, wherein determining the amplitude and the period of each of the consecutive video frames is the same as determining the amplitude and the period of the target video frame;
- determining a number of consecutive video frames each having a jitter based on the amplitude and the period of each of the consecutive video frames; and
- determining that there is a jitter in the video in response to the number of consecutive video frames each having a jitter being greater than a third number value.

\* \* \* \* \*